United States Patent
Ogneva et al.

(10) Patent No.: US 12,495,815 B2
(45) Date of Patent: Dec. 16, 2025

(54) PROCESS AND APPARATUS FOR THE PRODUCTION OF A MEAT ANALOGUE

(71) Applicant: MARS, INCORPORATED, McLean, VA (US)

(72) Inventors: Elena Ogneva, Verden (DE); Harm Henning Gaudig, Verden (DE); Lothar Helmut Meyer, Verden (DE); Walter Wilhelm Krueger, Verden (DE)

(73) Assignee: Mars, Incorporated, McLean, VA (US)

( * ) Notice: Subject to any disclaimer, the term of this patent is extended or adjusted under 35 U.S.C. 154(b) by 214 days.

(21) Appl. No.: 16/473,824

(22) PCT Filed: Dec. 15, 2017

(86) PCT No.: PCT/US2017/066719
§ 371 (c)(1),
(2) Date: Jun. 26, 2019

(87) PCT Pub. No.: WO2018/125615
PCT Pub. Date: Jul. 5, 2018

(65) Prior Publication Data
US 2020/0120954 A1    Apr. 23, 2020

(30) Foreign Application Priority Data

Dec. 29, 2016 (DE) .................. 10 2016 125 870.9

(51) Int. Cl.
| | |
|---|---|
| *A23J 3/22* | (2006.01) |
| *A23J 3/04* | (2006.01) |
| *A23J 3/14* | (2006.01) |
| *A23K 50/48* | (2016.01) |
| *A23L 13/40* | (2023.01) |
| *A23L 13/60* | (2016.01) |

(52) U.S. Cl.
CPC ............... *A23J 3/227* (2013.01); *A23J 3/04* (2013.01); *A23J 3/14* (2013.01); *A23K 50/48* (2016.05); *A23L 13/426* (2016.08); *A23L 13/67* (2016.08); *A23V 2002/00* (2013.01)

(58) Field of Classification Search
CPC ...... A23J 3/227; A23J 3/04; A23J 3/14; A23L 13/426; A23L 13/67
See application file for complete search history.

(56) References Cited

U.S. PATENT DOCUMENTS

| | | | |
|---|---|---|---|
| 5,945,152 A | 8/1999 | Purser | |
| 2008/0268112 A1* | 10/2008 | Rolan | A23L 13/65 426/601 |
| 2010/0136201 A1 | 6/2010 | Bigeard | |
| 2012/0160841 A1 | 6/2012 | Kimrey, Jr. et al. | |
| 2015/0181907 A1* | 7/2015 | Baumer | A23L 2/66 426/580 |
| 2015/0320085 A1* | 11/2015 | Ray | A23J 1/08 426/574 |
| 2016/0219904 A1* | 8/2016 | Reynes | A23K 50/45 |
| 2018/0219904 A1 | 8/2018 | Gorodissky et al. | |

FOREIGN PATENT DOCUMENTS

| | | |
|---|---|---|
| EA | 029553 B1 | 4/2018 |
| EP | 0 411 178 A1 | 2/1991 |
| EP | 1 231 846 B2 | 2/2013 |
| WO | WO 01/35766 A1 | 5/2001 |
| WO | WO 2015/172002 A2 | 11/2015 |
| WO | WO 2016/055940 A1 | 4/2016 |

OTHER PUBLICATIONS

Henriksson et al., "Experimental Investigation of Heat Transfer Rates and Pressure Drops through Compact Heat Exchangers", International Journal of Automotive Engineering 6, 2015, pp. 7-14. (Year: 2015).*

International Search Report mailed Apr. 3, 2018 in International Application No. PCT/US2017/066719.

* cited by examiner

*Primary Examiner* — Stephanie A Kohler
(74) *Attorney, Agent, or Firm* — Morrison & Foerster LLP

(57) ABSTRACT

The present invention relates to a process for the production of a meat analogue, comprising: a) introducing a meat batter which comprises protein into a first heating unit and heating the meat batter to a temperature above the denaturation temperature of the protein in the meat batter, but below the melting point of the protein to produce a first heat-treated product, and b) transferring the first heat-treated product to a second heating unit and heating the first heat-treated product to a temperature above the melting temperature of the protein to produce a second heat-treated product, c) cooling the second heat-treated product by moving through a cooling unit, so that the second heat-treated product has a temperature below water boiling temperature at ambient pressure when exiting the cooling unit, and d) dividing the cooled second heat-treated product into pieces; as well as to an apparatus for the production of a meat analogue.

3 Claims, No Drawings

PROCESS AND APPARATUS FOR THE PRODUCTION OF A MEAT ANALOGUE

CROSS-REFERENCE TO RELATED APPLICATION

This application is a U.S. National Stage Patent Application under 35 U.S.C. § 371 of International Application No. PCT/US2017/066719, filed on Dec. 15, 2017, which claims priority to German Patent Application Serial No. DE 10 2016 125 870.9 filed on Dec. 29, 2016, the contents of each of which are incorporated by reference in their entirety, and to which priority is claimed.

BACKGROUND

The present invention relates to processes and apparatus for the production of meat analogues.

Pet foods have long been manufactured from animal by-products and non-animal derived ingredients to prepare high quality food that provides the pet with the required nutrient profile without competing with the human food demand for meat. As the global population increases the global demand for high protein foods including meat is expected to increase, so an increasing need for pet foods prepared from meat analogues which meet the nutritional needs of pets is expected.

Meat analogues are typically prepared by mixing, chopping and emulsifying a mixture of raw meat ingredients such as beef, pork, lamb and chicken obtained from the muscle tissue and meat by-products. These raw meat ingredients are then mixed with various dry ingredients, for example vegetable by-products, starches, vitamins, minerals, gums, and glutens, to make a meat emulsion. The resulting meat emulsion is then extruded into a continuous slab or sheet that is further transferred into a steam tunnel where the slab/sheet is cooked by exposing it to heat. The cooked slab/sheet is then chopped into pieces, a sauce preparation or the like may be optionally added and the meat analogues packed and processed for sterilization.

WO 2016/055940 A1 discloses a method for producing non-meat food products having appearance and texture of cooked meat, comprising mixing dry ingredients comprising vegetable proteins with wet ingredients comprising at least one of water or oil to form a non-meat dough, heating the non-meat dough under pressure at a temperature from 110-180° C., and gradually cooling the heated non-meat dough to form a non-meat food product. EP 1 231 846 B2 discloses a method for producing a meat emulsion product comprising the steps of forming a meat emulsion containing at least 29% by weight protein, 4-7% by weight fat and 49-53% by weight moisture; comminuting and heating the meat emulsion to a temperature of 140-154° C.; and introducing the emulsion into a processing zone and subjecting the meat emulsion to a pressure of 1380-2415 kPa; and discharging the meat emulsion from the zone. According to WO 2016/055940 A1 and EP 1231 846 B2, heating is a one-step operation to achieve the final temperature of 180° C. and 154° C., respectively. WO 2015/172002 A2 discloses a method for producing meat-like chunks, wherein a meat slurry is introduced to a first scraped heat exchanger at a pressure of at least 1241 kPa and heat is applied to the first scraped heat exchanger to produce a first heat-treated meat product having a temperature of 38-66° C., and the first heat-treated meat product is then transferred to a second scraped heat exchanger and heat is applied to the second scraped heat exchanger to produce a second heat-treated meat product having a temperature of 60-85° C. The second heat-treated meat product is then transferred to a steam tunnel for further processing. This process does not provide a sufficient meat-like fibrous structure of the chunks.

The invention provides novel processes for the production of meat analogues which are more stable than existing processes for preparing meat analogues, which can be more precisely controlled during operation and which surprisingly provide meat analogues with improved uniformity and/or palatability compared to existing meat analogues. Advantageously the processes of the invention enable meat analogues to be prepared from meat batter wherein the exposure of the meat batter to very high temperatures is significantly reduced. Further, the meat analogues provided have unexpected improved palatability compared to meat analogues prepared by conventional processes. The invention further provides apparatus for the production of meat analogues according to the processes. The invention also provides processes for producing pet or human food from the meat analogues of the invention.

The invention provides processes for the production of a meat analogue comprising:

a) introducing a meat batter which comprises protein into a first heating unit and heating the meat batter to a temperature above the denaturation temperature of the protein in the meat batter but below the melting point of the protein to produce a first heat-treated product, and b) transferring the first heat-treated product to a second heating unit and heating the first heat-treated product to a temperature above the melting temperature of the protein to produce a second heat-treated product, c) cooling the second heat-treated product by moving through a cooling unit, so that the second heat-treated product has a temperature below water boiling temperature at ambient pressure when exiting the cooling unit, and d) dividing the cooled second heat-treated product into pieces.

Further embodiments of the inventive process may be taken from the sub-claims.

When used herein the term 'meat analogue' refers to a meat substitute suitable for use in pet or animal food as a meat replacement, which may suitably be a 'chunk'. The meat analogue may have sensory attributes similar to cooked meat. Meat analogues may be incorporated into pet or human food products. They are particularly suitable for inclusion in wet pet food products of all types, e.g. they can be incorporated into pates, loaves and chunk in sauce formats. They are particularly suitable for inclusion in 'chunk in sauce' products, e.g. 'chunk and gravy', 'chunk and jelly' or 'chunk and mousse' products. The meat analogues are typically between about 13 mm and about 20 mm in length along the longest dimension. They may suitably have a nutrient composition of about 45% to about 65% moisture, preferably about 50% to about 56% moisture, about 25% to about 36% protein, about 4% to about 13% fat, and about 1% to about 3% ash.

When used herein the term 'meat batter' refers to a thick mixture of water and other substances derived from raw materials, such as meat or meat by products. They are not emulsions such as mayonnaise or milk, but are dispersions of fat particles and air bubbles in a complex phase composed of water, solubilized meat protein, cellular components and other ingredients. They may also be referred to as a meat emulsion or a meat slurry. These terms are well understood in the art and are used interchangeably. Typically they comprise a continuous phase which is an aqueous medium containing soluble proteins, soluble muscle constituents, segments of muscle fibers, connective tissue fibers, bones etc. and optionally materials of plant origin materials such as proteins and/or starches and/or fibers and/or minerals. Meat batters/emulsions/slurries may also contain further additives as is common in the art. Meat batters can be obtained by known methods, e.g. by fragmenting frozen meat obtained from animal skeletal muscle to generate meat fragments which may be blended with water, one or more binding agent(s), and optionally other ingredients. Frozen meat is suitably chopped, crushed and ground to create a meat batter/slurry/emulsion. Typically the ground meat slurry will be size-reduced by use of a system comprising rotating and static elements, for example by means of rotating knives on die plates, and finally passes through a hole of characteristic diameter. In various embodiments, the maximum diameter of the hole is about 0.5 mm, about 1 mm, about 2 mm, about 3 mm, about 4 mm, about 5 mm, about 6 mm, about 7 mm, about 8 mm, about 9 mm, and/or about 10 mm. The resulting finer ground meat emulsion can suitably be transferred to a mixer where water, dry ingredients (e.g. protein powder of vegetable origin) and liquid ingredients (e.g. colourants) can be optionally added to provide a meat batter.

When used herein, the term 'protein' refers to one or more proteins suitably provided by one or more of the raw materials. The protein may suitably be animal proteins, vegetable proteins or any combination thereof. Animal proteins include any protein of animal origin (including vertebrate and invertebrate proteins), e.g. proteins derived from mammals, fowl, fish and insects. Examples of suitable animal proteins include those derived from chicken, turkey, beef, lamb, pork, venison, buffalo, duck, kangaroo, shell fish, crustaceans, salmon, tuna, whitefish etc. They may suitably be derived from muscle meat, organs, tendons, bone etc. Further suitable animal proteins include milk or egg derived proteins. Suitable vegetable proteins include proteins derived from wheat gluten, soy protein isolate, maize, pea, rice, peanuts, hemp, cotton seed, lupine, potato etc. or blends thereof The proteins may be in any suitable form, e.g. isolated or partially isolated; concentrated; ground etc.

The first and second heating units may suitably be any heating system known in the art, e.g. they may suitably comprise a high shear emulsifier, a heat exchanger or a dielectric heater. In some embodiments at least one of the first and second heating units comprises a heat exchanger, preferably a scraped surface heat exchanger. When used herein, the term 'scraped surface heat exchanger' refers to a mechanical device having a heated surface and a device for dislodging material from the heated surface by scraping. An example of a suitable scraped surface heat exchanger comprises a tubular device with a heated jacket surrounding its outer wall, through which heat is transmitted. Such a tubular device can include a center rotor with scrapers fixed to it. When such a center rotor rotates the scrapers remove product from the inner wall of the tubular device. In use a mixture of ingredients can be fed into one end of the tubular device and pushed through the device. The heating and the motion through the annular space between the heated inner wall of the cylinder and the center rotor results in a transformation of the mixture. Scraped surface heat exchangers have the advantage of moving the ingredient mixture constantly through a pipe or similar hollow cylinder that is arranged such that heat is applied to its external surface. This can be accomplished by encasing the pipe or cylinder in a water bath that can be maintained at a desired temperature, e.g. by encasing the pipe or cylinder in a thermal agent medium, steam chamber, themo-oil or other suitable heated medium that can be maintained at the desired temperature. Also the use of an external electrical heated outer temperature source is possible. The temperature difference between the interior and exterior of the scraped surface heat exchanger causes the ingredient mixture to be heated through indirect heating. Scraped surface heat exchangers are well known in the art. In preferred embodiments both the first and the second heating units comprise a heat exchanger, preferably they both comprise a scraped surface heat exchanger.

In one embodiment, the second heating unit may comprise a microwave heating unit, a radio frequence heating unit or an Ohmic heating unit, the use thereof may reduce the residence time of the first heat-treated product in the second heating unit.

In another embodiment, the process and the apparatus of the invention may comprise the use of additional heating units, for example a heating unit before step a) for heating the meat batter to a temperature below the denaturation temperature of the protein, and/or a further heating unit between step a) and step b) for further heating the first heat-treated product below the melting temperature of the protein.

In another embodiment, two or more heating units may be operated in parallel in one process step. In another embodiment, two or more heating units may be also operated in series in one process step.

When the meat batter enters the first heating unit it may suitably have a temperature of about 10° C.-35° C., preferably 15° C.-25° C. The slurry can suitably be pumped into the unit at about 800-2000 kPa, preferably 1000-1250 kPa and heated as it passes through the unit, e.g. by supplying a heat jacket with steam. In some embodiments the meat batter is heated in the first heating unit to a temperature of about 90° C. to about 120° C.; about 100° C. to about 120° C.; about 90° C. to about 115° C.; about 100° C. to about 115° C.; about 90° C. to about 110° C.; or about 100° C. to about 110° C. In further embodiments the first heat-treated product is heated in the second heating unit to a temperature of about 140° C. to about 170° C.; about 145° C. to about 170° C.; about 150° C. to about 170° C.; about 155° C. to about 170° C.; about 160° C. to about 170° C.; about 140° C. to about 165° C.; about 145° C. to about 165° C.; about 150° C. to about 165° C.; 155° C. to about 165° C. or about 160° C. to about 165° C. The ratio of residence time of the batter in the first heating unit to the residence time in the second heating unit is suitably from about 3:2 to about 14:2, preferably from about 3:2 to about 7:2, more preferably from about 4:2 to about 6:2. In some embodiments, the pressure in the first heating unit and the pressure in the second heating unit exceed the water vapor pressure at the respective local temperature. In some embodiments the pressure in the first heating unit and the pressure in the second heating unit are substantially equal and are preferably in a range between about 800 to about 2000 kPa; about 800 to about 1,800 kPa; about 1,000 to about 1,800 kPa; about 1,000 to about 1,500 kPa; more preferably between about 1000 kPa to about 1250 kPa. This pressure range allows efficiency of energy transfer and reduction of wear of the equipment, for example the scrapers in a scraped surface heat exchanger. The second heat-treated product may suitably be divided into pieces at a temperature of about 40° C. to about 80° C.; about 40° C. to about 70° C.; about 50° C. to about 80° C.; about 50° C. to about 70° C.

The meat batter utilized in the inventive process typically comprises a mixture of proteins having differing denaturation temperatures and melting temperatures. Preferably substantially all the protein in the meat batter is denatured in the first heating unit. Preferably in the second heating unit at least 50 wt. %, 60 wt. %, 70 wt. %, 80 wt. % or 90 wt. % of protein, based on the total amount of protein in the meat batter, is melted. Most preferably substantially all the protein is melted. In one embodiment, it is only necessary that enough protein is melted to form a cohesive and continuous outer phase of the second heat-treated product that may carry non-melted other proteins, fibers, bone particles, etc.

When used herein, the term "denaturation" related to proteins means that denatured proteins have lost their three-dimensional structure. Denatured proteins may exhibit a wide range of characteristics, from loss of solubility to protein aggregation.

When used herein, the melting point of a protein is the temperature at which it changes state from solid to liquid at the pressure selected.

The denaturation temperature of a protein may be measured by methods well known in the art, for example by use of a rubber process analyzer. As a rubber process analyzer, a respective analyzer from TA Instruments, Wetzlar, Germany, Model RPA Elite, may be used, measuring viscoelastic properties of protein/moisture samples pursuing a temperature sweep analysis delivering a protein melting range.

Concerning the melting range for the proteins used, rheological measurements may be utilized, wherein the melting range is the temperature range, where after an increase in viscosity due to the denaturing (unfolding) of the proteins a drop of viscosity is observed indicating a change from a suspension of solids into a homogeneous liquid phase.

Also the melting point of a protein may be measured by methods well known in the art, for example by differential scanning calorimetry (DSC).

For individual proteins, respective data of denaturation temperature and melting point can be also obtained from scientific literature.

The second heat treated product is suitably a layered and/or aligned product formed as the material cools in step (c). As the melted material solidifies a layered fibrous meat analogue structure is formed. Steps (c) and/or step (d) is optionally performed under pressure of about 800-2000 kPa, so that the protein solidifies step by step in layers which create a fibrous structure. Thus, in the cooling step the aggregate of the protein changes from a liquid melt to a solid phase.

In other words, the protein setting is the controlled solidification of melted protein. The formation of meat-like fibers is the direct result of an appropriately controlled cooling. As described above, if the first heat-treated product has been heated above the melting point of the protein, at least part of that protein (or the protein mixture) is said to be melted. Once proteins have been brought to the melted state, upon cooling, they will solidify into a strong, elastic mass with leather-like properties. This mass does not easily re-melt and cannot be pumped mechanically. Thus, it is important that, once melted, protein is maintained in motion and cooled in a cooling unit from which solidified material can be continuously discharged.

The second heat treated product exits the second heating unit at e.g. 140° C. to about 170° C. and is cooled to a temperature below water boiling temperature in a cooling unit, e.g. using a tubular cooling zone cooled with water. Also, a rectangular shaped cooling die design may be used. The product is transferred through the unit, e.g. along a cool surface, and forms into a layered fibrous structure as the melt solidifies (as the product temperature drops below its melting point). This occurs under pressure and in motion and the protein solidifies step by step in layers to create fibrous structures.

When used herein the term "dividing" refers to any operation to comminute the second heat-treated product, for example cutting, ripping, tearing, squeezing, hammer milling, etc. This may suitably be performed using a grid or rotary cutting device. Dividing may be performed in one or more steps, for example a first cutting may be performed using a grid cutter followed by a second cutting using a rotary cutter. The resulting meat analogues are irregular, random or essentially random in shape. Optionally, they can be transferred to an inspection station for visual inspection to facilitate quality control, manual or automatic, e.g. using a digital camera and suitable image recognition software.

The invention also provides apparatus for the production of a meat analogue which have all the advantages discussed for the processes. The apparatus of the invention comprises:
  i) a first heating unit,
  ii) a first transfer means for transferring a meat batter comprising protein into the first heating unit,
  the first heating unit being operable to be heated to a temperature above the denaturation temperature of the protein but below the melting temperature of the protein,
  iii) a second heating unit being operable to heat a first heat-treated product obtained from the first heating unit to a temperature above the melting temperature of the protein in the first heat-treated product,
  wherein the first heating unit and the second heating unit are arranged in series,
  iv) a cooling unit located downstream the second heating unit and operable to cool down a second heat-treated product obtained from the second heating unit below water boiling temperature at ambient pressure when exiting the cooling unit, and
  v) a dividing unit located downstream the cooling unit suitable for dividing cooled down second heat-treated product obtained from the cooling unit into pieces.

The apparatus may also additionally comprise one or more of:
  i) a grinder for grinding meat,
  ii) a mixer,
  iii) an emulsifying unit or a batter pump installed upstream of the first transfer means,
  iv) a conditioning unit,
  v) a packaging unit,
  vi) a sterilization unit installed downstream of the second heating unit.

The first transfer means may suitably be a pump or the like which allows transfer of the meat batter, the first heat-treated product and the second heat-treated product through all steps of the apparatus. If necessary further transfer means may be provided, for example between the first heating unit and the second heating unit, between the second heating unit and the cooling unit or between the cooling unit and the dividing unit. The further transfer means may be also any type of a pump or the like. Preferably the processes and apparatus of the invention do not utilize and/or comprise a steam tunnel.

The first and/or the second heating unit(s) may suitably be slightly tilted. In such embodiments the heat-treated product preferably enters the heating unit(s) from below, allowing air to be forced out of the units, ensuring improved heat transfer.

Further features and advantages of the invention are illustrated in the following examples, which are not intended to be limiting in any way.

EXAMPLES

Example 1

Three parts of a slurry containing 90.8% meat and animal derivatives, 4.7% water, and 4.5% of at least one of vitamins, minerals, palatants, colorants, etc. (all percentages are weight percentages based on the total weight of the slurry) as to achieve a nutritionally complete cat food finished product were mixed with one part vegetable protein powder containing at least 75% protein (vital wheat gluten) to form a semisolid mixture containing 30.5% crude protein, 59% moisture and 4.5% fat (all percentages of the semisolid mixture are based on the total weight of the semisolid mixture).

The mixture was fed into a first SSHE unit with a volume of approx. 17 L and a surface to volume ratio of 60 $m^2/m^3$ under 1,200 kPa product pressure. The first SSHE unit was continuously supplied with steam at a temperature between 134-136° C. and the shaft operated at 200 rpm. The outlet temperature of the material from this heating unit was between 109° C. and 111° C. The material was immediately directed into a second SSHE unit with a volume of approx. 9.7 L and a surface to volume ratio of 60 $m^2/m^3$ under 1,200 kPa product pressure. The second SSHE unit was continuously supplied with steam at a temperature between 166° C.-168° C. and the shaft operated at 300 rpm. The outlet temperature of the material from this heating unit was between 158° C.-160° C. The residence time in the two heating units was distributed as two-thirds in the first heating unit and one third in the second heating unit. The material was then directed to a cooling area through which its temperature was brought down to below 80° C. The solid material obtained was cut to produce meat analogues with internal fibrosity.

Comparative Example 2

Three parts of meat emulsion containing 90.8% meat and animal derivatives, 4.7% water, and 4.5% of at least one of vitamins, minerals, palatants, colorants, etc. (all percentages are weight percentages based on the total weight of the slurry) as to achieve a nutritionally complete cat food finished product were mixed with one part vegetable protein powder containing at least 75% protein (vital wheat gluten) to form a semisolid mixture containing 30.5% crude protein, 59% moisture and 4.5% fat (all percentages of the semisolid mixture are based on the total weight of the semisolid mixture).

The mixture was fed into a SSHE unit with a volume of approx. 14.6 L and a surface to volume ratio of 60 $m^2/m^3$ under 1,200 kPa product pressure. The SSHE unit was continuously supplied with steam at a temperature between 166° C.-168° C. and the shaft operated at 300 rpm. The outlet temperature of the material from this heating unit was between 158° C.-160° C.

The material was then directed to a cooling area through which its temperature was brought down to below 80° C. The solid material obtained was cut to produce meat analogues with internal fibrosity.

A comparison of food intake by cats between the product manufactured using two SSHEs and the product manufactured using one SSHE showed cats eating on average 21% less (weight) from the product manufactured using a single SSHE, a statistically significant loss under conditions tested.

Comparative Example 3

Three parts of meat emulsion containing 90.8% meat and animal derivatives, 4.7% water, and 4.5% of at least one of vitamins, minerals, palatants, colorants, etc. (all percentages are weight percentages based on the total weight of the slurry) as to achieve a nutritionally complete cat food finished product were mixed with one part vegetable protein powder containing at least 75% protein (vital wheat gluten) to form a semisolid mixture containing 30.5% crude protein, 59% moisture and 4.5% fat (all percentages of the semisolid mixture are based on the total weight of the semisolid mixture).

The mixture was fed into a first SSHE unit with a volume of approx. 17 L and a surface to volume ratio of 60 $m^2/m^3$ under 1,200 kPa product pressure. The first SSHE unit was continuously supplied with steam at a temperature between 120° C.-125° C. and the shaft operated at 200 rpm. The outlet temperature of the material from this heating unit was below coagulation temperature and between 60° C. and 70° C. The material was immediately directed into a second SSHE unit with a volume of approx. 9.7 L and a surface to volume ratio of 60 $m^2/m^3$ under 1,200 kPa product pressure. The second SSHE unit was continuously supplied with steam at a temperature between 120° C.-125° C. and the shaft operated at 200 rpm. The outlet temperature of the material from this heating unit was below melting temperature and between 80° C.-85° C. The residence time in the two heating units was distributed as two-thirds in the first heating unit and one third in the second heating unit. The material was then directed to a cooling area through which its temperature was brought down to below 80° C.

No internal fibrosity was observed in the outlet material, only protein coagulation.

Comparative Example 4

Three parts of meat emulsion containing 90.8% meat and animal derivatives, 4.7% water, and 4.5% of at least one of vitamins, minerals, palatants, colorants, etc. (all percentages are weight percentages based on the total weight of the slurry) as to achieve a nutritionally complete cat food finished product were mixed with one part vegetable protein powder containing at least 75% protein (vital wheat gluten) to form a semisolid mixture containing 30.5% crude protein, 59% moisture and 4.5% fat (all percentages of the semisolid mixture are based on the total weight of the semisolid mixture).

The mixture was fed into a first SSHE unit with a volume of approx. 17 L and a surface to volume ratio of 60 $m^2/m^3$ under 1,200 kPa product pressure. The first SSHE unit was continuously supplied with steam at a temperature between 134° C.-136° C. and the shaft operated at 200 rpm. The outlet temperature of the material from this heating unit was between 90° C. and 95° C. The material was immediately directed into a second SSHE unit with a volume of approximately 9.7 L and a surface to volume ratio of 60 $m^2m^3$ under 1,200 kPa product pressure. The second SSHE unit was continuously supplied with steam at a temperature between 166° C.-168° C. and the shaft operated at 250 rpm. The outlet temperature of the material from this heating unit was below melting temperature and between 120° C.-125° C. The residence time in the two heating units was distributed as two-thirds in the first heating unit and one third in the second heating unit. The material was then directed to a cooling area through which its temperature was brought down to below 80° C.

No internal fibrosity was observed in the outlet material, only protein coagulation.

The features disclosed in the foregoing description and in the claims may, both separately and in any combination, be material for realizing the invention in diverse forms thereof.

What is claimed is:

1. A process for production of a meat analogue having internal fibrosity, comprising:
   a) introducing a meat emulsion comprising protein into a first scraped surface heat exchanger and heating the meat emulsion to a temperature of about 109° C. to about 111° C. under a pressure of 800-1200 kPa, with steam at a temperature of about 134° C. to about 136° C., to produce a first heat-treated product;
   b) transferring the first heat-treated product to a second scraped surface heat exchanger separate from the first scraped surface heat exchanger, wherein at least one of the first scraped surface heat exchanger or the second scraped surface heat exchanger are tilted such that at least one of the meat emulsion or first heat-treated product enters the first or second scraped surface heat exchanger from below;
   c) heating the first heat-treated product to a temperature of about 158° C. to about 160° C., with steam at a temperature of about 166° C. to about 168° C., to produce a second heat-treated product under a pressure of 800-1200 kPa;
   d) cooling the second heat-treated product by moving the second heat-treated product through a cooling unit under a pressure of 800-2000 kPa, wherein the second heat-treated product has a temperature below water boiling temperature at ambient pressure when exiting the cooling unit; and
   e) dividing the second heat-treated product into pieces to produce the meat analogue having internal fibrosity;
   wherein the ratio of a residence time of the meat emulsion in the first scraped surface heat exchanger to a residence time of the first heat-treated product in the second scraped surface heat exchanger is from 4:2 to 14:2.

2. The process according to claim 1, wherein the protein comprises an animal protein, a non-animal protein or a mixture thereof.

3. The process according to claim 1, wherein the ratio of the residence time of the meat emulsion in the first scraped surface heat exchanger to the residence time of the first heat-treated product in the second scraped surface heat exchanger is from 4:2 to 6:2.

* * * * *